United States Patent
Kimball et al.

(10) Patent No.: US 10,112,137 B2
(45) Date of Patent: Oct. 30, 2018

(54) MARINE ENGINE STRAINER ASSEMBLY

(71) Applicant: Indmar Products Company Inc., Millington, TN (US)

(72) Inventors: Kevin J. Kimball, Mount Dora, FL (US); Rachel M. Mashburn, Memphis, TN (US); Jason C. Stimmel, Eads, TN (US); Jason Vetzel, Brighton, TN (US)

(73) Assignee: Indmar Products Company Inc., Millington, TN (US)

( * ) Notice: Subject to any disclaimer, the term of this patent is extended or adjusted under 35 U.S.C. 154(b) by 741 days.

(21) Appl. No.: 14/831,074

(22) Filed: Aug. 20, 2015

(65) Prior Publication Data

US 2017/0050714 A1    Feb. 23, 2017

(51) Int. Cl.
| | |
|---|---|
| *B01D 29/62* | (2006.01) |
| *B01D 35/30* | (2006.01) |
| *B01D 35/16* | (2006.01) |
| *B01D 29/23* | (2006.01) |
| *B01D 29/96* | (2006.01) |
| *B01D 35/02* | (2006.01) |

(52) U.S. Cl.
CPC ............ *B01D 35/30* (2013.01); *B01D 29/23* (2013.01); *B01D 29/96* (2013.01); *B01D 35/16* (2013.01); *B01D 29/62* (2013.01); *B01D 35/02* (2013.01)

(58) Field of Classification Search
USPC ......................................................... 210/411
See application file for complete search history.

(56) References Cited

U.S. PATENT DOCUMENTS

| | | | | |
|---|---|---|---|---|
| 4,160,733 | A | * | 7/1979 | Nelson ................... B01D 29/23 123/41.05 |
| 4,919,800 | A | * | 4/1990 | Vinoski ................... F01P 3/205 134/169 A |
| 5,705,065 | A | * | 1/1998 | Sharpe ................... B01D 29/35 210/232 |
| 7,025,643 | B1 | | 4/2006 | Csitari |
| 7,625,256 | B2 | | 12/2009 | Bertino et al. |
| 8,105,123 | B2 | | 1/2012 | Hamlin |
| 2012/0009831 | A1 | | 1/2012 | Howard |

OTHER PUBLICATIONS

Flushing Strainer, Perko, Catalog No. 300, 2005-2006, two pages.

* cited by examiner

*Primary Examiner* — Thomas M Lithgow
(74) *Attorney, Agent, or Firm* — Wood, Herron & Evans, LLP

(57) ABSTRACT

A strainer assembly for a marine engine has a housing with an internal cavity. The housing has a threaded inlet end, an outlet and a flush port. A removable cover assembly covers the threaded inlet end and may be removed to allow a strainer to be removed from inside the housing and cleaned. The flush port may be closed with a plug and opened to allow a threaded end of a garden hose to be attached to the flush port for cleaning the engine.

20 Claims, 11 Drawing Sheets

MARINE ENGINE STRAINER ASSEMBLY

FIELD OF THE INVENTION

The present invention relates to a strainer assembly for a marine internal combustion engine which also may be used as a flush kit.

BACKGROUND OF THE INVENTION

In marine internal combustion engines, such as inboard marine engines, cooling systems use raw water drawn from the ambient body of water on which the boat operates. The boat may be operated in fresh or salt water. Regardless of whether the boat is operated in fresh or salt water, the raw water from the ocean, lake or river may carry sand, sediment, algae, minerals and other debris into the cooling system which may obstruct the flow of the cooling liquid and/or build deposits in the engine's cooling system.

After running an inboard marine engine in salt water, it is desirable to remove the salt and other debris from the cooling system. The engine's cooling system may be kept free of such debris by regularly and properly flushing the cooling system with fresh water to remove any salt residue. Such flushing maintains the operation of the marine engine and ensures safe operation of the marine engine. U.S. Pat. No. 7,025,643 discloses one such flushing system. One drawback of known flush kits for use with marine engines is that they require numerous fittings, clamps and bulky components. Therefore, a flush kit for use in a marine engine which is incorporated into a strainer would be desirable.

In addition, inboard marine engines need to be winterized to prevent damage during the winter. Therefore, the water in the cooling system must be drained or flushed. A need for a flush kit which enables water to be drained from the engine would be desirable.

SUMMARY OF THE INVENTION

The present invention provides an improved strainer assembly for a marine engine. The strainer assembly comprises a housing having an upstream end, a downstream end and an internal cavity therebetween. The downstream end of the housing has a flush port and an outlet. A strainer is removably located inside the internal cavity of the housing. A housing cover assembly is removably secured to the upstream end of the housing. The housing cover assembly comprises a cover having an inlet adapted to introduce water into the internal cavity of the housing and a retainer for securing the position of the cover. The strainer may be removed from the internal cavity of the housing upon removal of the housing cover assembly.

The strainer assembly further comprises a plug having a first portion adapted to fit inside the flush port and a second portion having external threads. The plug may be secured in place by a rotatable collar having internal threads adapted to engage the exterior threads of the second portion of the plug to close the flush port. The rotatable collar may be loosened and the plug removed from the collar and an end of a garden hose secured to the flush port of the housing to flush the marine engine.

According to another aspect of the invention, the strainer assembly for a marine engine comprises a housing having an upstream end, a downstream end having an outlet and an internal cavity therebetween. The housing has a flush port proximate the outlet. A strainer is removably located inside the internal cavity of the housing. A housing cover assembly is removably secured to the upstream end of the housing. The housing cover assembly has an inlet adapted to introduce water into the internal cavity of the housing.

The strainer assembly further comprises a plug adapted to close the flush port and a rotatable collar. The rotatable collar has internal threads adapted to engage exterior threads of the plug to secure the plug in place. The plug may be removed and a threaded end of a garden hose secured to the flush port of the housing using the rotatable collar to flush the marine engine with fresh water.

According to another aspect of the invention, the strainer assembly for a marine engine comprises a housing having a threaded upstream end, a downstream end having an outlet and an internal cavity therebetween. The housing has a flush port. A strainer is removably located inside the internal cavity of the housing. A housing cover assembly is removably secured to the upstream end of the housing. The housing cover assembly has an inlet adapted to introduce water into the internal cavity of the housing.

The strainer assembly further comprises a plug adapted to fit into and close the flush port of the housing. A rotatable collar is adapted to secure the plug in place wherein the plug may be removed and a threaded end of a garden hose secured to the flush port of the housing using the rotatable collar to flush the marine engine with fresh water.

To this end, and in accordance with principles of the present invention, the strainer assembly allows a boat operator to quickly and efficiently empty a strainer which cleans the water circulating to and from the transmission and engine.

By virtue of the foregoing, there is thus provided an improved apparatus for flushing the cooling system of salt water of a marine engine when the marine engine is out of the water. These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE DRAWINGS

Figure 1:
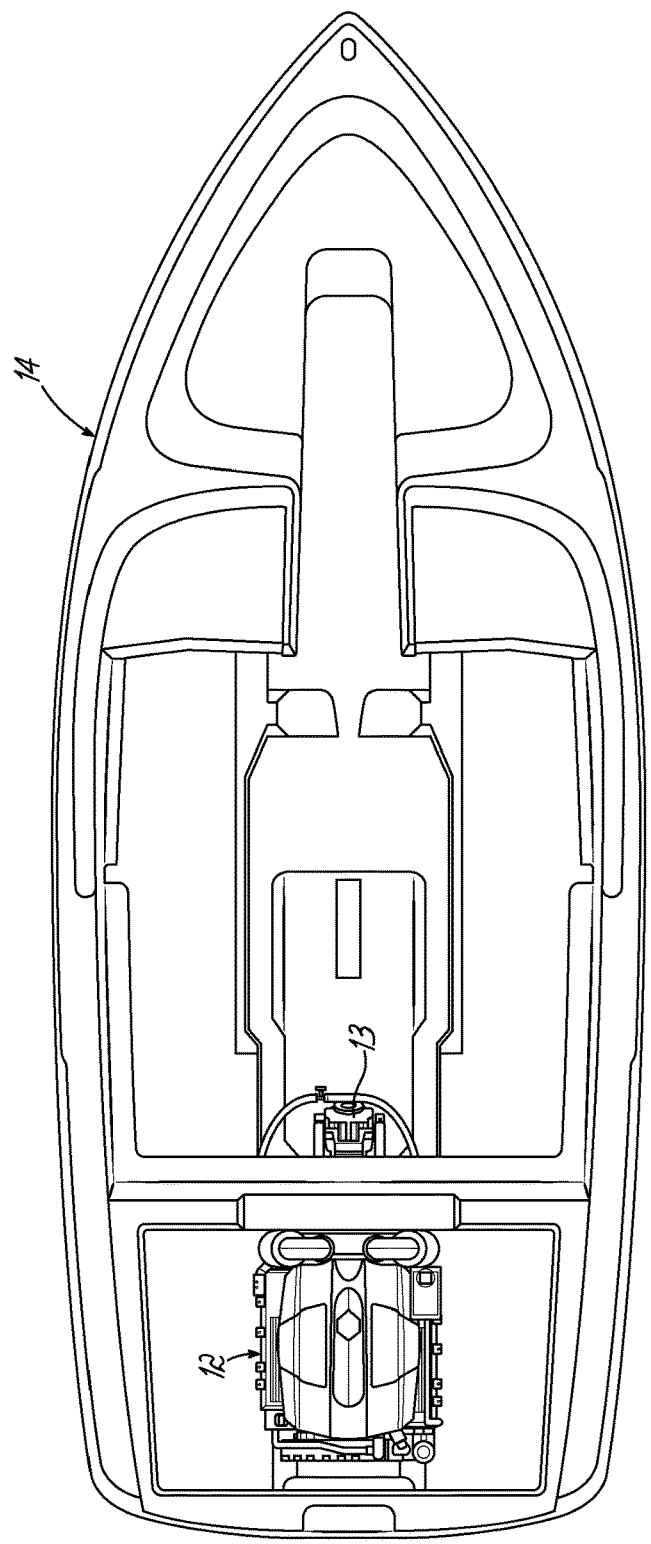
FIG. 1 is a top view of a motorboat with an internal combustion engine having a strainer assembly in accordance with the principles of the present invention.
Figure 3:
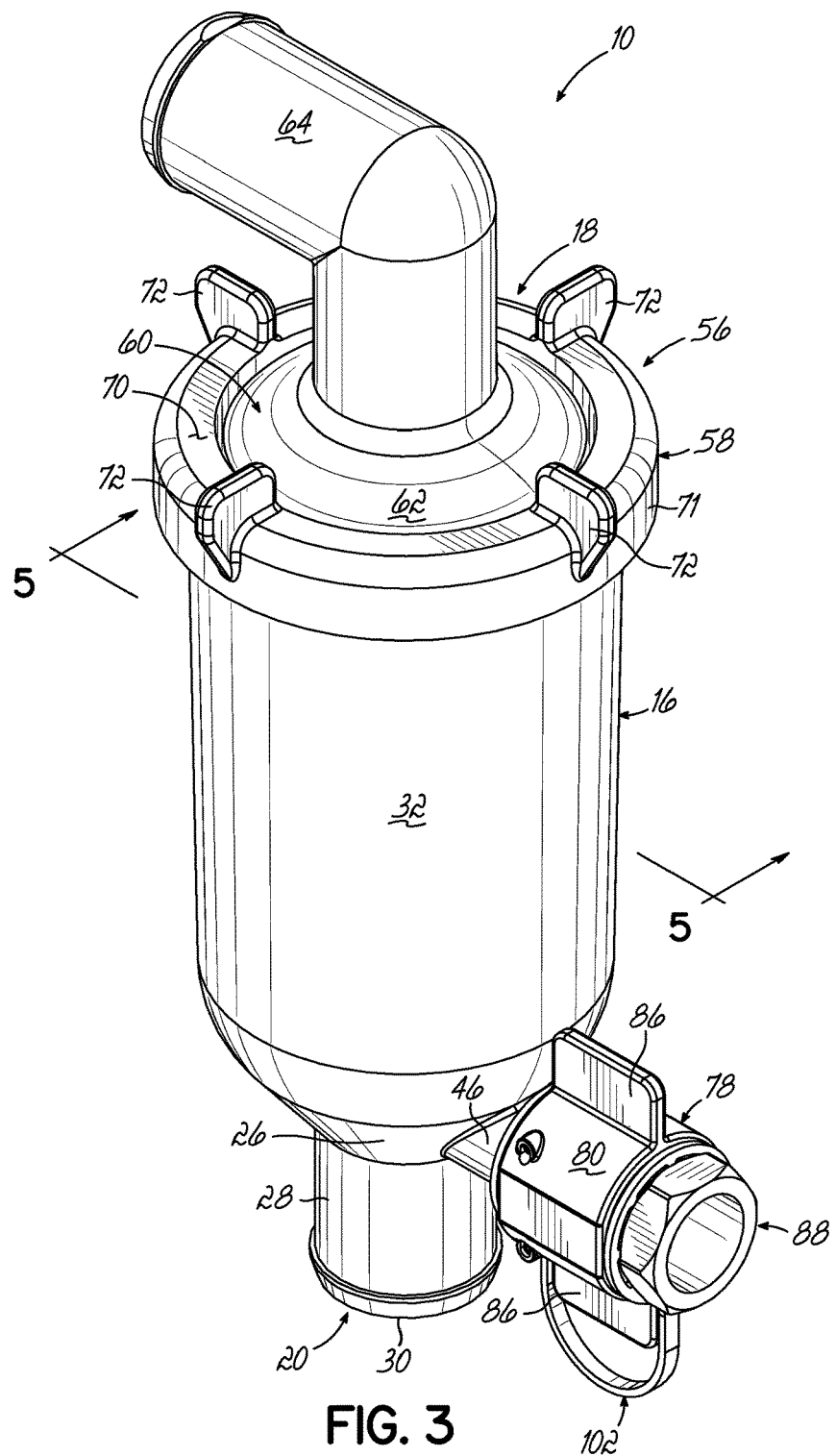
FIG. 3 is a perspective view of the strainer assembly used in the internal combustion engine of FIG. 1 in an assembled condition.

With reference to FIG. 3, there is shown a strainer assembly 10, constructed in accordance with the principles of the present invention. The strainer assembly 10 is intended for use with a marine engine 12 in a boat 14, but may be used in other environments. FIG. 1 illustrates the general position of the engine 12, including its transmission 13 in the boat 14, but is not intended to limit the type of engine 12, transmission 13 or type of boat 14 in which the strainer assembly 10 may be used.

Figure 2:
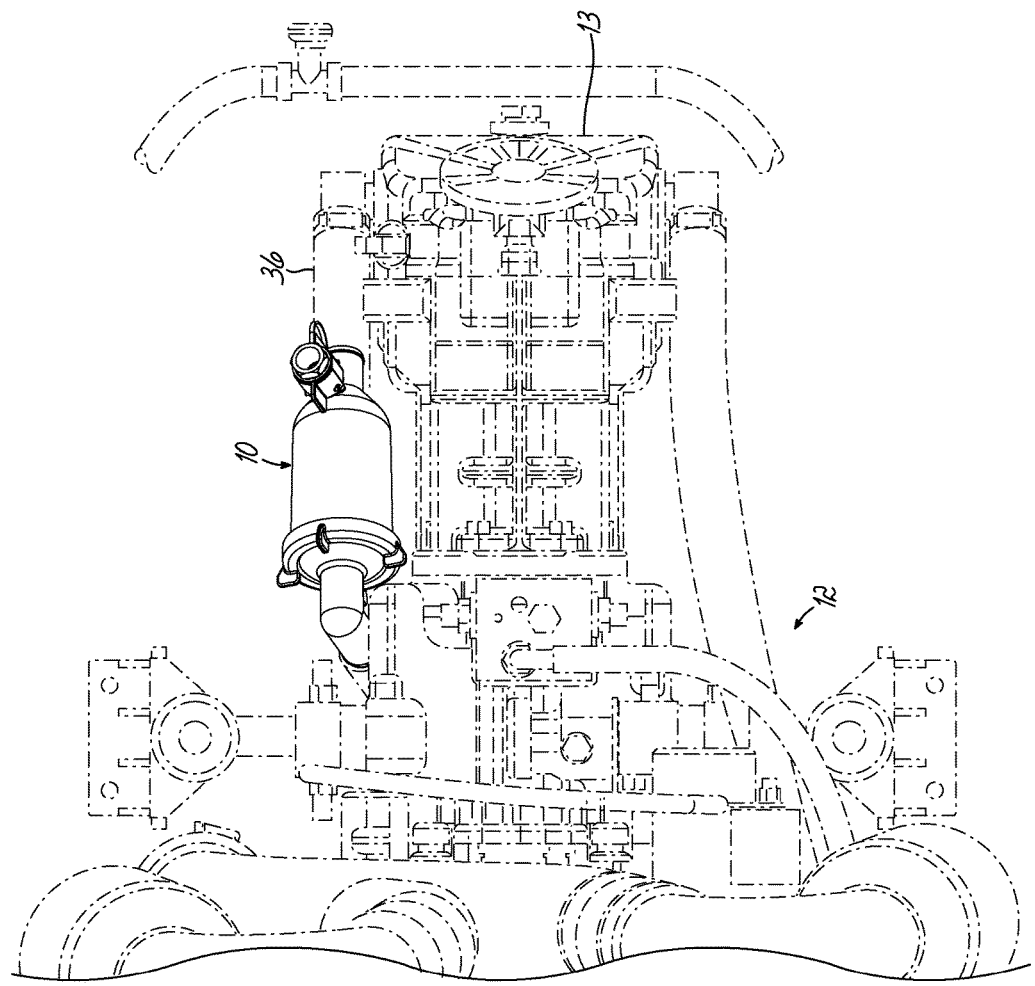
FIG. 2 is an enlarged top view of a portion of the internal combustion engine of FIG. 1.
Figure 4:
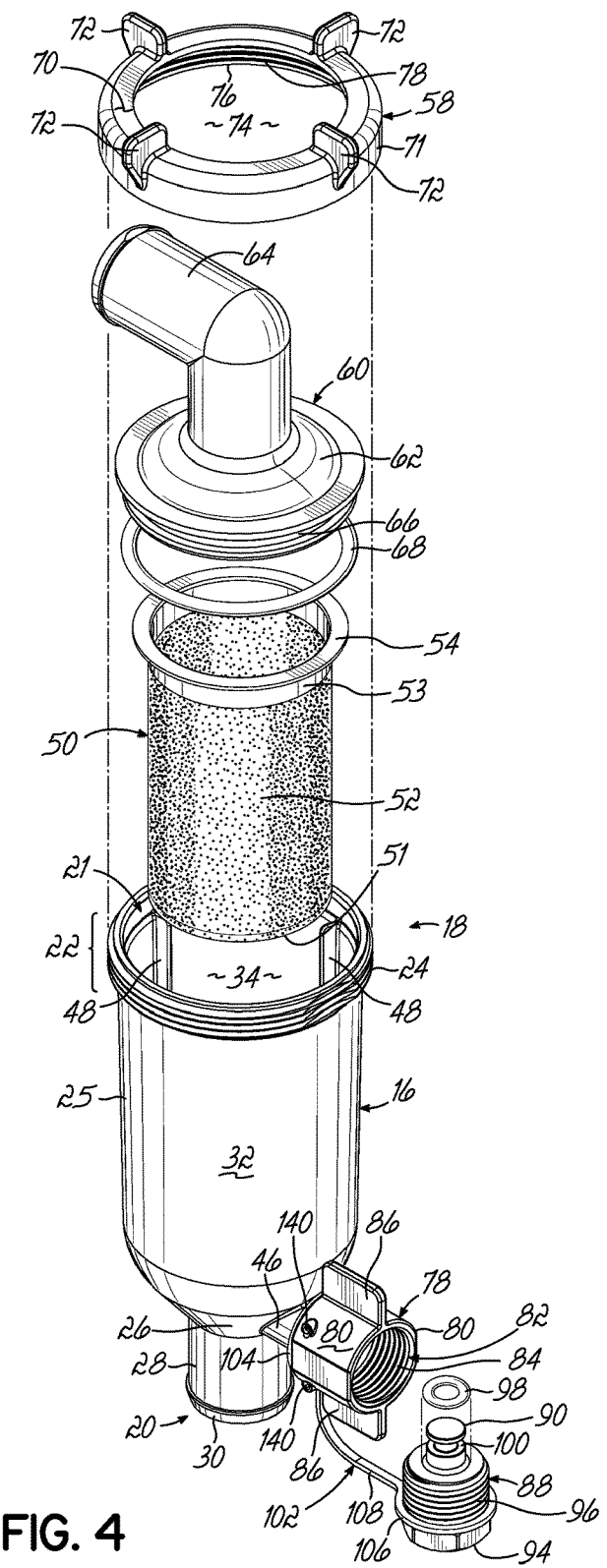
FIG. 4 is a partially disassembled view of the strainer assembly of FIG. 3.
Figure 5:
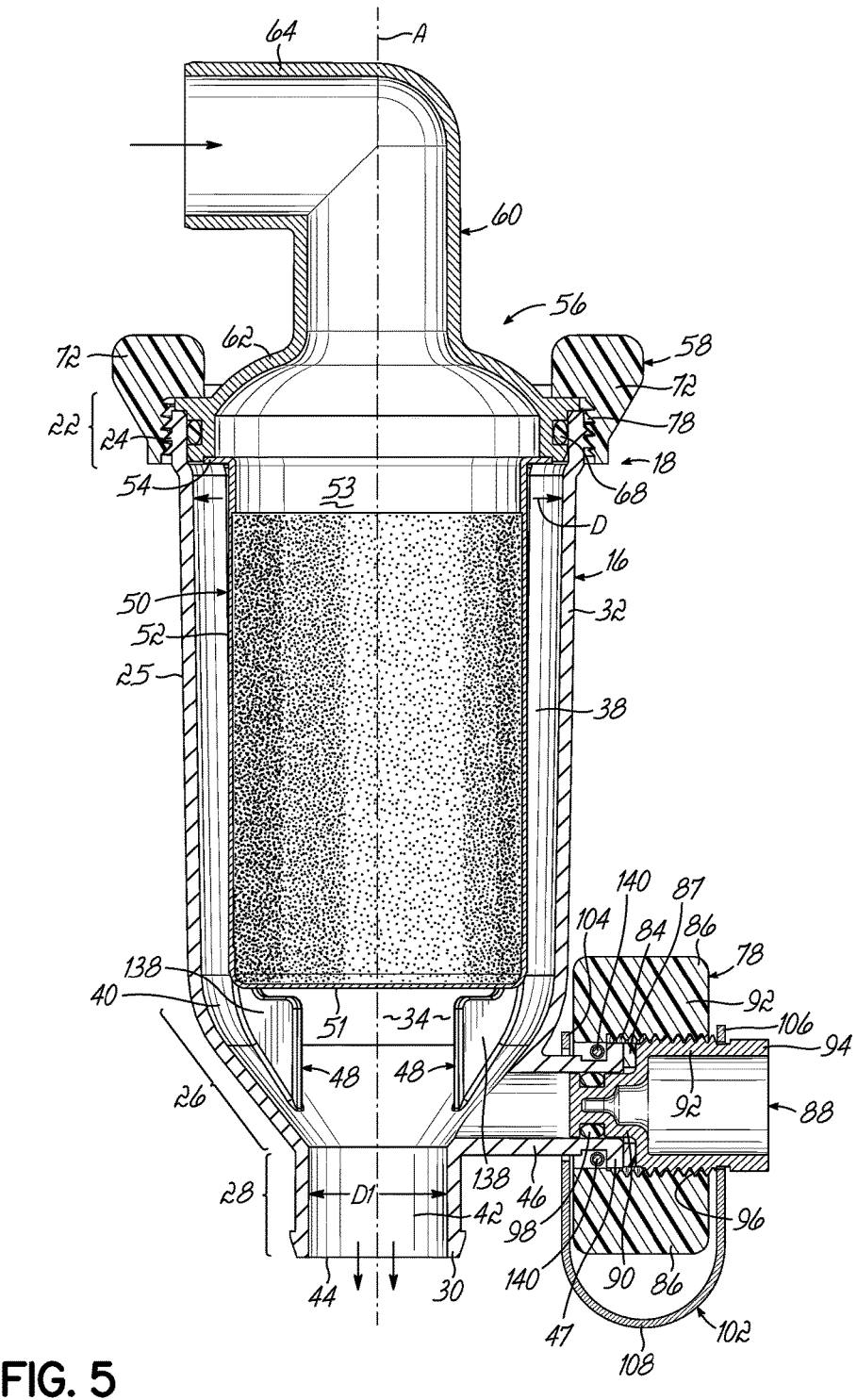
FIG. 5 is cross-sectional view taken along the line 5-5 of FIG. 3.

FIGS. 3 and 5 illustrate the strainer assembly 10 in an assembled condition while FIG. 4 illustrates the strainer assembly 10 in a disassembled condition. As shown in FIGS. 3-5, the strainer assembly 10 comprises a housing 16 having an upstream end 18, a downstream end 20 and a central axis A. As shown in FIG. 4, the housing 16 of strainer assembly 10 has an open top 21 and a threaded portion 22 having external threads 24 at the upstream end 18 of the housing 16. FIGS. 4 and 5 show the housing 16 having a cylindrical housing shell 32 having an interior cavity 34. As shown in FIG. 4, the housing shell 32 of housing 16 has a main portion 25, a funnel portion 26 and an outlet portion 28 terminating in a lip 30 adapted to receive and retain a hose 36 which extends to the transmission of the engine (shown in dashed lines in FIGS. 2 and 6). The lip 30 is located at the downstream end 20 of the housing 16. The housing 16 is typically made of clear polycarbonate, but may be made of any partially translucent material to allow a user to observe flow through the strainer assembly.

As shown in FIG. 5, the interior cavity 34 of the housing 16 has a main portion 38 having an inner diameter D, a funnel portion 40 having a narrowing inner diameter as it extends downstream and an outlet portion 42 having an inner diameter D1 less than the inner diameter D of the main portion 38. Lastly, the housing 16 has an outlet 44 in fluid communication with the hose 36 which extends to the transmission 13 of the engine 12 (shown in dashed lines in FIG. 6).

As best shown in FIG. 5, the housing shell 32 of housing 16 also has a flush port 46 which extends perpendicular to housing axis A. The flush port 46 extends generally perpendicular to the central axis A of housing 16 and terminates with an outwardly extending flange 47, as shown in FIG. 5.

Figure 7A:
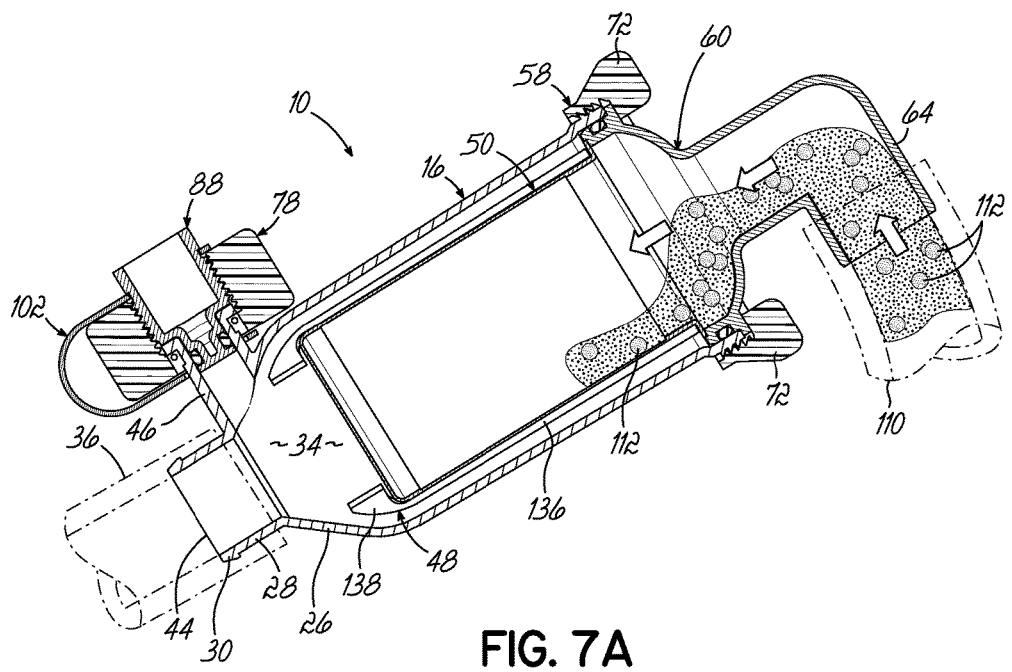
FIG. 7A is a cross-sectional view of the strainer assembly of FIG. 3 showing unfiltered water entering the assembly.

As best shown in FIGS. 5 and 7A, the housing shell 32 of housing 16 also has a plurality of spaced ribs 48 (only two being shown) located in the interior cavity 34 of the housing 16. Although the strainer assembly 10 typically comprises four ribs 48, any number of ribs may be used. As best shown in FIG. 7A, each rib 48 has a narrow portion 136 located in the main portion 38 of the interior cavity 34 of the housing 16 and a wide portion 128 located in the funnel portion 40 of the interior cavity 34 of the housing 16.

Referring to FIGS. 4 and 5, strainer 50 comprises a cylindrical metal mesh basket 52 having a bottom 51 and an upper solid metal upper portion 53, including a radially outwardly extending flange 54. Although the strainer 50 is typically made of metal, it may be made of any desired material. Although one shape and size of the strainer 50 is illustrated, those skilled in the art will appreciate that other sizes or shapes of strainer may be utilized. When the strainer assembly 10 is assembled, the flange 54 of strainer 50 sits on top of the ribs 48, and the basket 52 of the strainer 50 resides inside the narrow portions 136 of ribs 48, as best shown in FIG. 5.

As best shown in FIGS. 4 and 5, a housing cover assembly 56 is removably attached to the housing shell 18. As shown in FIG. 5, the cover assembly 56 comprises a retainer 58 and a cover 60. The cover 60 has a circular body portion 62 and an integral generally "L-shaped" inlet 64 which rotate together relative to the retainer 58. As best shown in FIG. 4, the circular body portion 62 of cover 60 has a groove 66 in which is located an O-ring 68. The inlet 64 is illustrated as being generally "L-shaped", but may be any desired configuration.

As best shown in FIG. 4, the retainer 58 has a top surface 70 with a ring portion 71 extending downwardly from the top surface 70. A plurality of tabs 72 extend radially outward from a hollow center portion 74 of the retainer 58. Although four tabs 72 are illustrated, any number of tabs of any shape may be incorporated into the retainer 58. The tabs 72 are used by a boat operator to rotate the retainer 58 to open and close the housing cover assembly 56 in order to remove and clean the strainer 50 and reinsert the strainer 50 into the interior 34 of the housing 16. As best illustrated in FIG. 5, the retainer 58 has a threaded interior surface 76 comprising threads 78. Upon assembly, the circular body portion 62 of cover 60 resides inside the hollow center portion 74 of the retainer 58 and is rotatable therein to achieve the desired position of the inlet 64. In order to secure the housing cover assembly 56 to the housing 16 and fix the position of the cover 60 relative to the retainer 58, the retainer 58 is rotated using tabs 72 so the threads 78 of retainer 58 engage the exterior threads 24 of the threaded portion 22 at the upstream end 18 of the housing 16. Conversely, to remove the housing cover assembly 56 from the housing 16 or change the position of the cover 60, including inlet 64 relative to the retainer 58, the retainer 58 is rotated in the opposite direction using tabs 72.

As best shown in FIGS. 4 and 5, the strainer assembly 10 further comprises a collar 78 rotatably secured to the flush port 46 of the housing 16. More particularly, the collar 78 has two securing members 140 extending through the collar 78 inside the flange 47 of the flush port 46. These securing members 140, in conjunction with the flange 47 of the flush port 46, keep the collar 78 attached to the flush port 46, although the collar 78 is rotatable relative to the flush port 46. As shown in FIG. 4, the rotatable collar 78 has a cylindrical body portion 80 having a passage 82 adapted to fit over the flange 47 of the flush port 46. A portion of passage 82 has internal threads 84. The rotatable collar 78 also has two wings 86 to assist in rotating the collar 78 relative to the flush port 46.

The strainer assembly 10 further comprises a plug 88 having a first portion 90 adapted to fit inside the interior of the flush port 46 and a second portion 92 adapted to fit inside the passage 82 of the collar 78. See FIGS. 4 and 5. The second portion 92 of the plug 88 has an end portion 94 with multiple planar surfaces so the plug 88 may be rotated with a tool, such as a socket or a wrench. The second portion 92 of the plug 88 has exterior threads 96 adapted to engage the internal threads 84 of the passage 82 of the rotatable collar 78. As shown in FIG. 4, an O-ring 98 resides in a groove 100 in the first portion 90 of plug 88. As shown in FIG. 5, a gasket 87 is located between the flange 47 of flush port 46 and the plug 88 to prevent damage to the plug 88. The plug 88 may be made of plastic or any other desired material.

A lanyard 102 has a first end 104 which surrounds the flush port 46 and a second end 106 which surrounds the plug 88, as shown in FIG. 4. The first and second ends 104, 106 of the lanyard 102 are joined by a connector 108 to prevent the plug 88 from falling in the water or becoming lost once removed from the collar 78. The lanyard is typically made of plastic, but may be made of any desired material.

Figure 6:
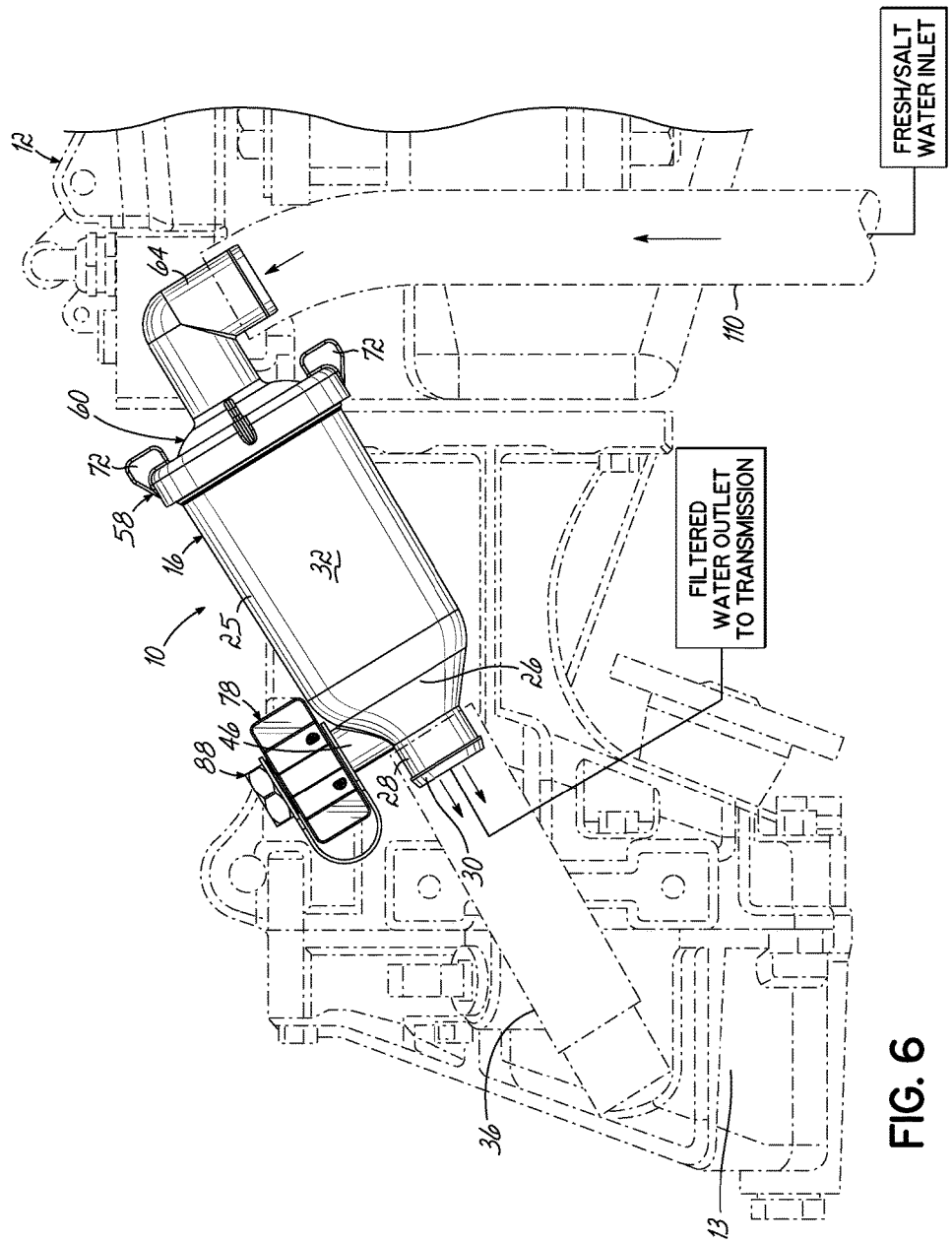
FIG. 6 is a side elevational view of the strainer assembly of FIG. 3.

FIG. 6 illustrates the position of the strainer assembly 10 relative to the remainder of the engine 12 and transmission 13. Water is introduced from the bottom of the boat through an inlet hose 110 into the inlet 64 of the housing cover assembly 58. Water flows into the housing 16, through the strainer 50 where undesirable particles and debris are removed, then through the outlet 44 of the housing 16, then through a hose 36 which extends to the transmission 13 of the engine 12. During this operation, the plug 88, in its inserted position closing the flush port 46, prevents water from exiting the flush port 46 of the housing 16.

Figure 7B:
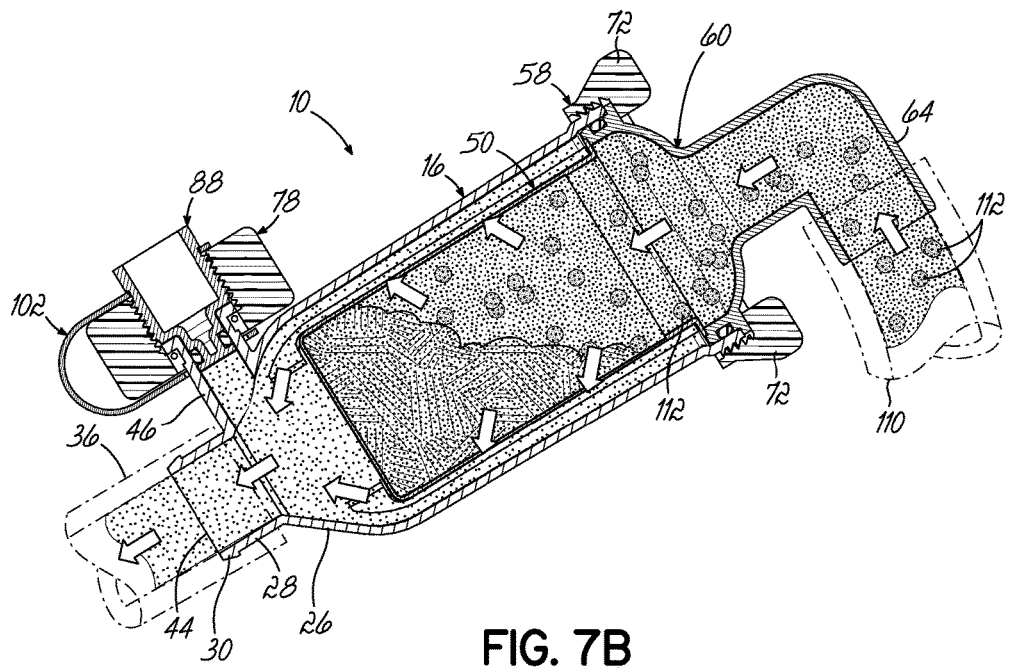
FIG. 7B is a cross-sectional view of the strainer assembly of FIG. 7A showing the strainer filling with debris.

In use, a first fluid, usually fresh or salt water, is introduced into the inlet port 64 of cover 60 via hose 110, shown in FIG. 6. During operation, the water filled with debris particles 112 flows upwardly through the inlet 64 and into the interior of the housing, more specifically, through the strainer 50. As shown in FIG. 7B, the water flows through the strainer 50 and exits outlet 44 of housing and passes into hose 36.

Figure 7C:
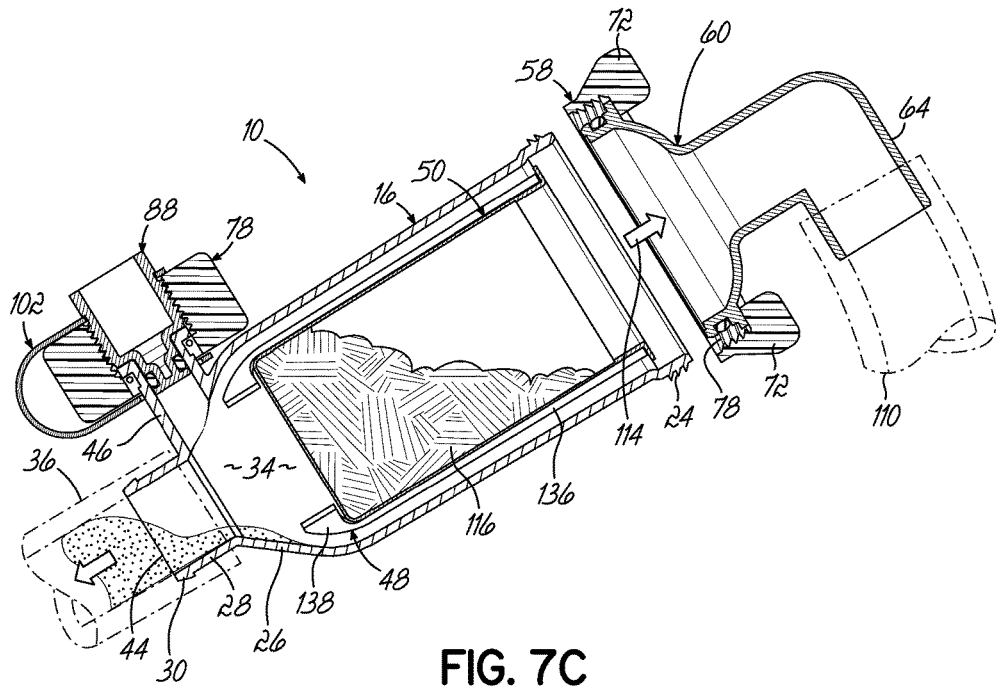
FIG. 7C is a cross-sectional view of the strainer assembly of FIG. 7A showing the cover assembly being removed to enable the strainer to be emptied.
Figure 7D:
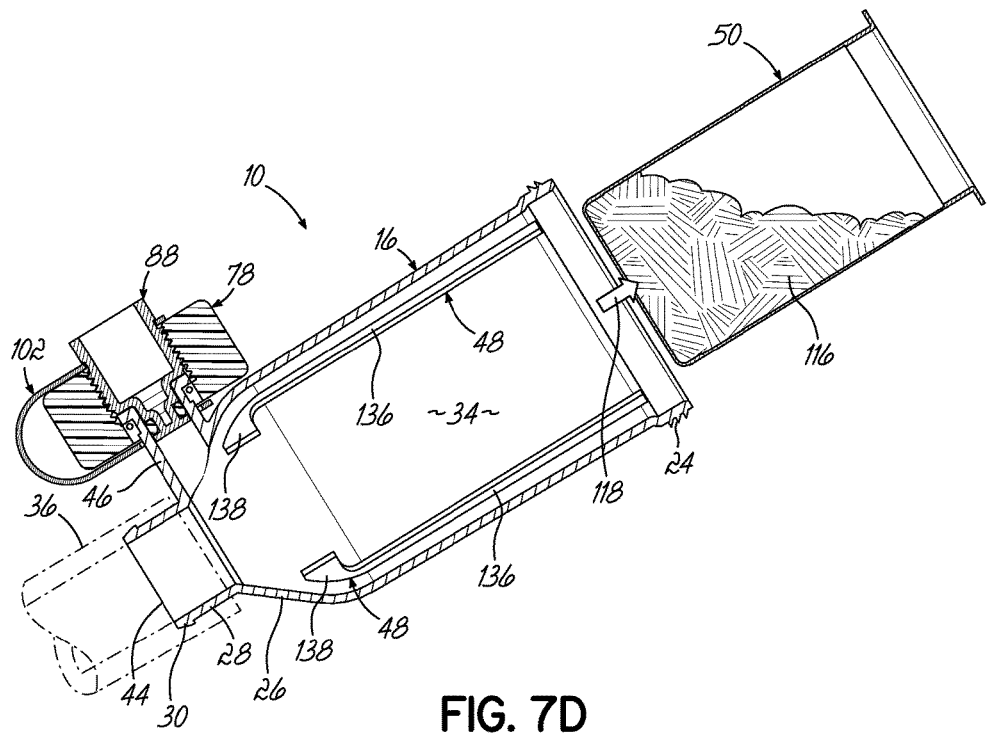
FIG. 7D is a cross-sectional view of the strainer assembly of FIG. 7A showing the strainer being removed from inside the housing to be emptied.
Figure 7E:
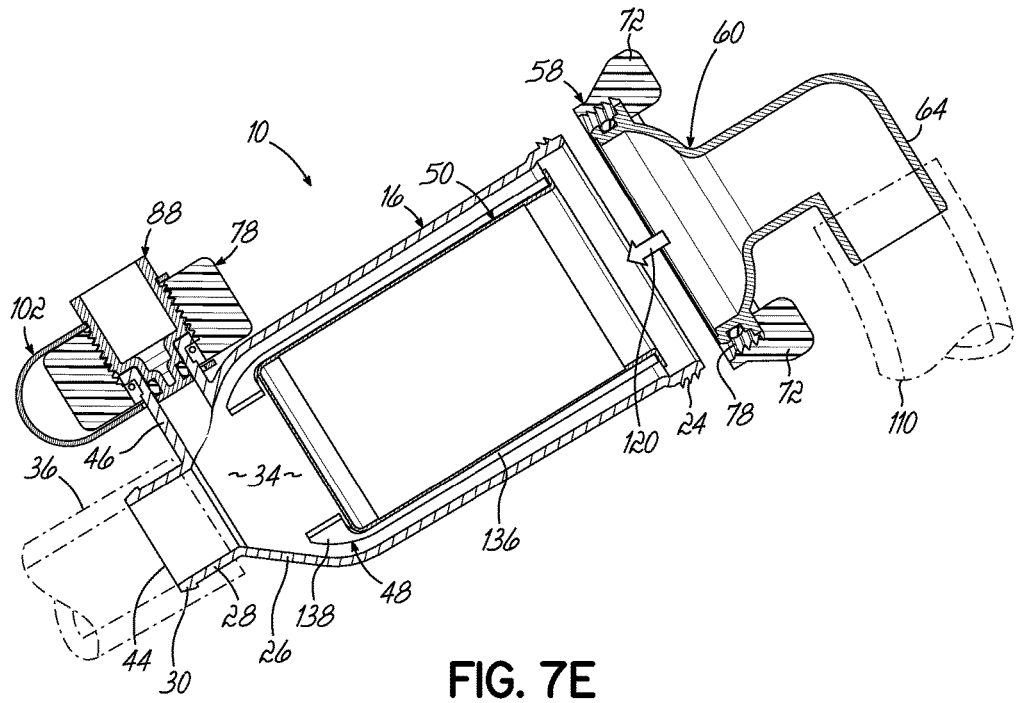
FIG. 7E is a cross-sectional view of the strainer assembly of FIG. 7A showing the cover assembly being reattached to the housing after the strainer has been emptied.

During operation of the marine engine 12, the debris particles 112 collect inside the strainer 50 with clean water exiting the strainer assembly 10 and passing to the engine transmission via hose 36. As shown in FIG. 7C, an operator may remove the cover assembly with the hose 110 attached by turning the cover assembly 56 using tabs 72 of retainer 58. The cover assembly 56 may then be separated from the remainder of the strainer assembly 10 by moving the cover assembly 56 in the direction of arrow 114. As shown in FIG. 7D, an operator may remove the strainer 50 filled partially with debris 116 by moving the strainer 50 in the direction of arrow 118. After the operator empties and cleans the strainer 50 so it is again empty, the operator reinserts the emptied strainer 50 in its proper location in the interior 34 of the housing 16. As shown in FIG. 7E, the operator then moves the cover assembly 56 with the hose 110 attached in the direction of arrow 120. The operator then secures the cover assembly 56 in place by turning the cover assembly 56, using tabs 72 of retainer 58.

Figure 7F:
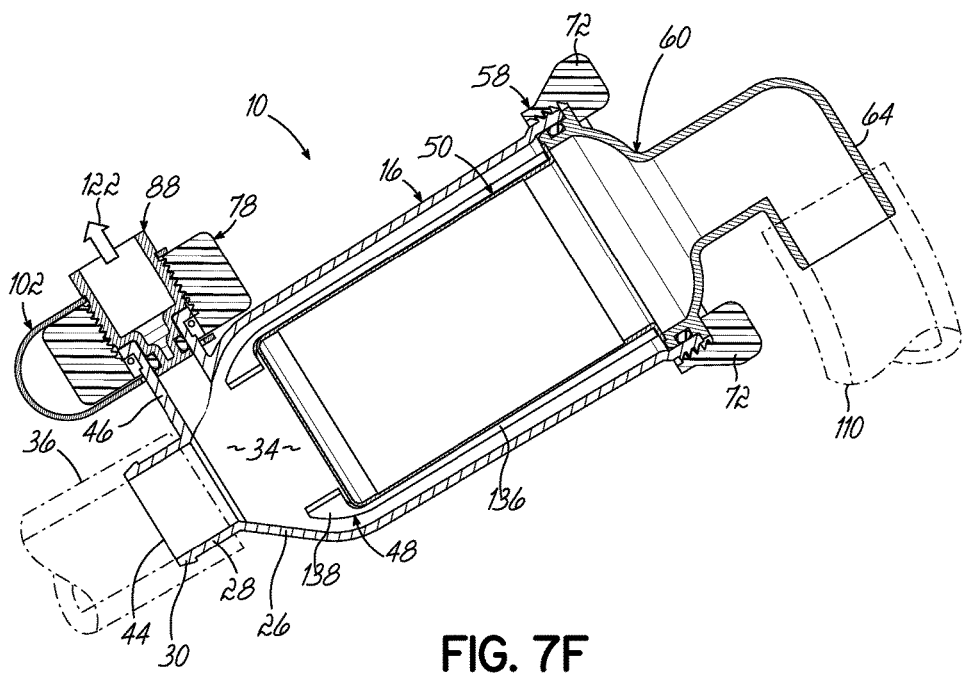
FIG. 7F is a cross-sectional view of the strainer assembly of FIG. 7A in its original condition showing the plug being removed to flush the engine.

As shown in FIG. 7F, once the boat 12 has been lifted out of the water, in order to begin to flush the engine 12, an operator removes the plug 88 from inside the flush port 46 in the direction of arrow 122 after rotating/loosening the collar 78.

Figure 7G:
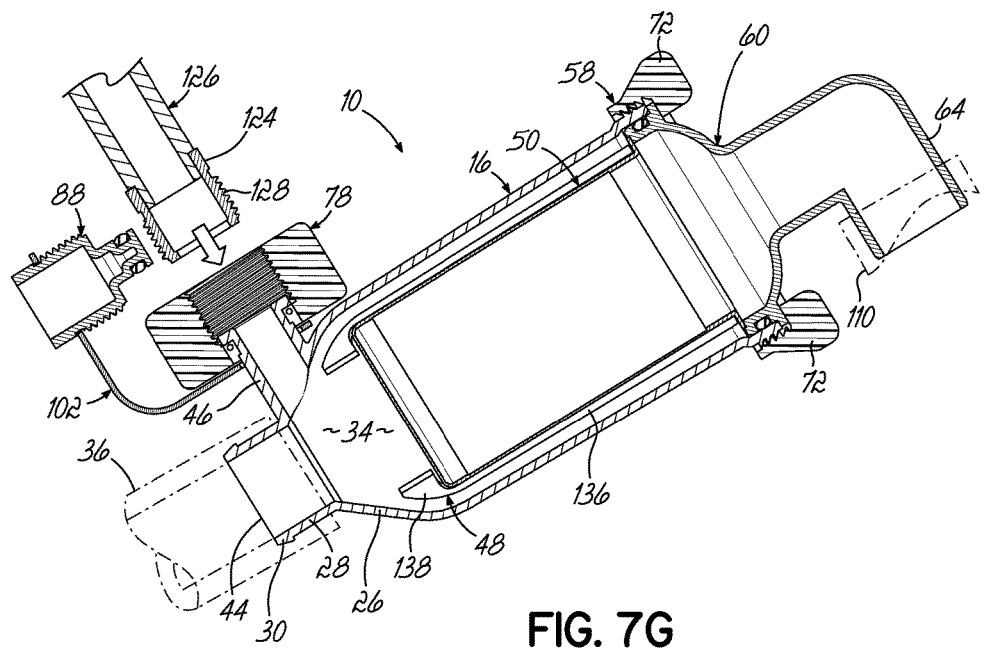
FIG. 7G is a cross-sectional view of the strainer assembly of FIG. 7A showing the plug removed from the flush port and an end of a garden hose approaching the flush port.
Figure 7H:
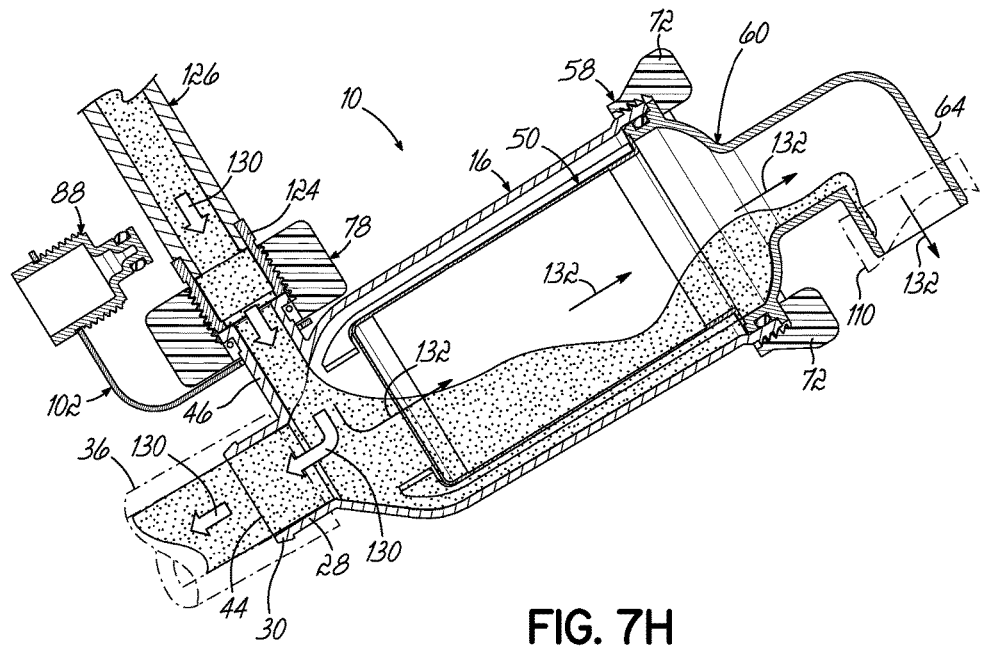
FIG. 7H is a cross-sectional view of the strainer assembly of FIG. 7A showing the end of the garden hose secured to the flush port and fresh water going to the engine transmission.
Figure 7I:
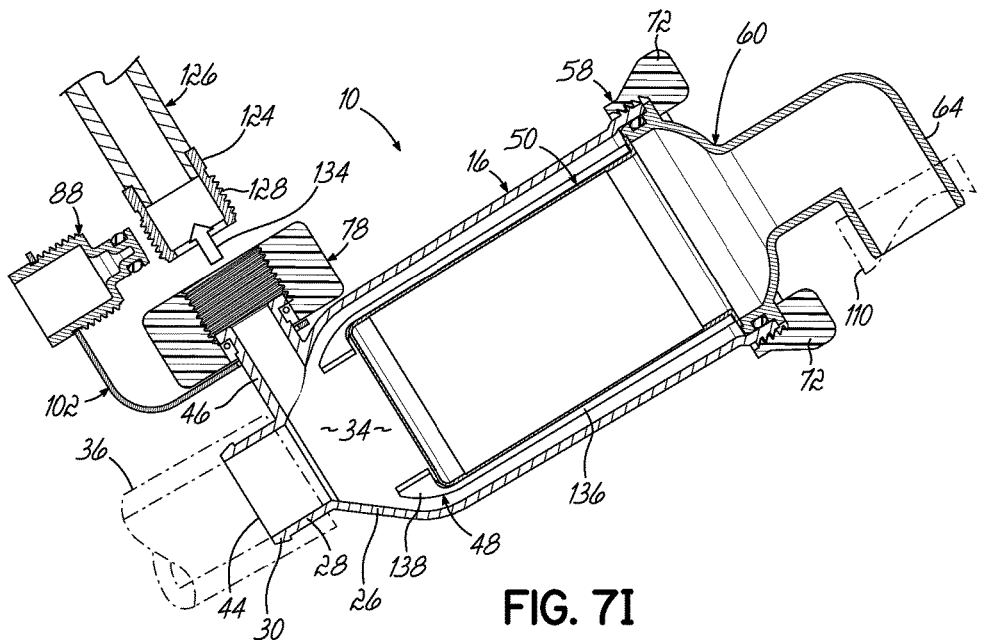
FIG. 7I is a cross-sectional view of the strainer assembly of FIG. 7A showing the end of the garden hose being separated from the flush port.
Figure 7J:
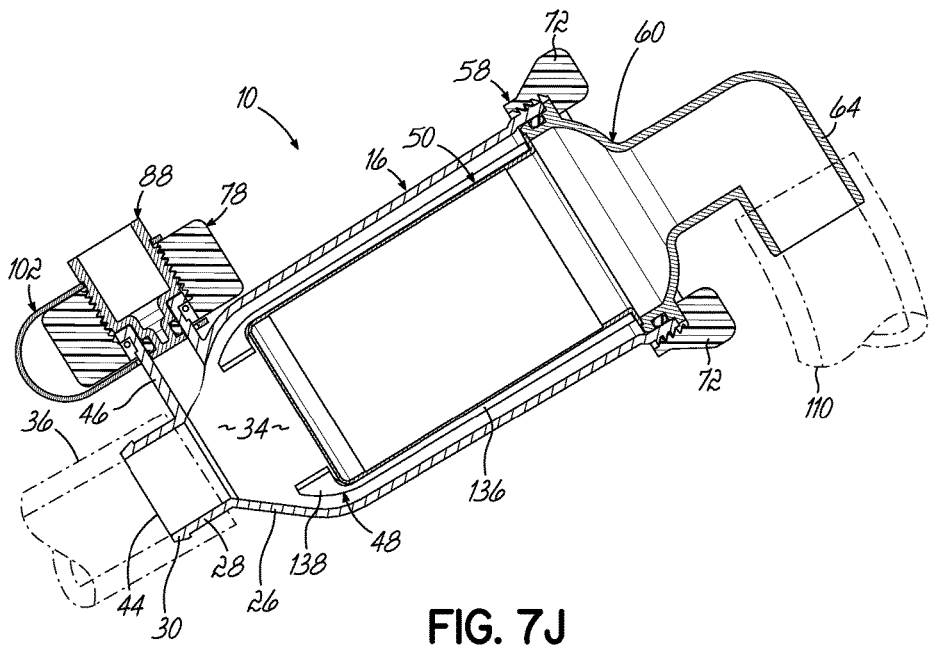
FIG. 7J is a cross-sectional view of the strainer assembly of FIG. 7A showing the plug reinserted into the flush port.

FIG. 7G illustrates an end 124 of a garden hose 126 having exterior threads 128 approaching the collar 78. FIG. 7H illustrates the end 124 of garden hose 126 secured to the flush port 46 with collar 78 and water flowing in the direction of arrows 130 into hose 36 extending to the transmission 13. Some water from the garden hose 126 flows upstream in the direction of arrows 132 to further cleanse the strainer 50. FIG. 7I illustrates the end 124 of garden hose 126 removed from the flush port 46 in the direction of arrow 134 after the collar 78 has been loosened. FIG. 7J illustrates the plug 88 secured to the flush port 46 with collar 78, and the boat ready for operation again.

By virtue of the foregoing, there is thus provided a strainer assembly which functions to strain unwanted debris from a water or coolant and be emptied of debris quickly and efficiently without disturbing operation of the engine.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, the orientation of the inlet and/or outlet may be any desired diameter or length and have any number of shapes. The invention in its broader aspects is, therefore, not limited to the specific details, representative apparatus and method, and illustrative examples shown and described. Accordingly, departures may be made from such details without departing from the spirit or scope of the general inventive concept.

Having described the invention, what is claimed is:

1. A strainer assembly for a marine engine, the strainer assembly comprising:
    a housing having an upstream end, a downstream end and an internal cavity therebetween, the downstream end of the housing having a flush port and an outlet;
    a strainer removably located inside the internal cavity of the housing;
    a housing cover assembly removably secured to the upstream end of the housing, the housing cover assembly comprising a cover having an inlet adapted to introduce water into the internal cavity of the housing and a retainer for securing the position of the cover wherein said strainer may be removed from the internal cavity of the housing upon removal of the housing cover assembly;
    a plug having a first portion adapted to fit inside the flush port and a second portion having external threads wherein said plug may be secured in place by a rotatable collar having internal threads adapted to engage the exterior threads of the second portion of the plug to close the flush port wherein said rotatable collar may be loosened and said plug removed from said flush port of said housing and an end of a garden hose secured to the flush port of the housing to flush the marine engine.

2. The strainer assembly of claim 1 further comprising a lanyard extending between the plug and the flush port.

3. The strainer assembly of claim 1 wherein the inlet of the housing cover is generally L-shaped.

4. The strainer assembly of claim 1 wherein the flush port and the housing outlet are perpendicular.

5. The strainer assembly of claim 1 wherein the cover of the housing cover assembly is movable relative to the housing upon loosening the retainer of the housing cover assembly.

6. The strainer assembly of claim 1 wherein the collar is rotatably secured to the flush port.

7. A strainer assembly for a marine engine, the strainer assembly comprising:
- a housing having an upstream end, a downstream end having an outlet and an internal cavity therebetween, the housing having a flush port proximate the outlet;
- a strainer removably located inside the internal cavity of the housing;
- a housing cover assembly removably secured to the upstream end of the housing, the housing cover assembly having an inlet adapted to introduce water into the internal cavity of the housing;
- a plug adapted to close the flush port;
- a collar rotatably secured to the flush port, the collar having internal threads adapted to engage exterior threads of the plug to secure the plug in place, wherein said plug may be removed and a threaded end of a hose secured to the rotatable collar to flush the marine engine with fresh water.

8. The strainer assembly of claim 7 wherein the housing cover assembly comprises a retainer having external threads adapted to engage a threaded upstream end of the housing and a rotatable housing cover inside the retainer, the housing cover including the water inlet.

9. The strainer assembly of claim 7 further comprising a lanyard extending between the plug and the housing.

10. The strainer assembly of claim 7 wherein the inlet of the housing cover assembly is generally L-shaped.

11. The strainer assembly of claim 7 wherein the flush port and the housing outlet are perpendicular.

12. The strainer assembly of claim 7 wherein the strainer may be removed from the interior of the housing only when the housing cover assembly is opened.

13. The strainer assembly of claim 7 wherein the housing cover assembly comprises a retainer adapted fix the position of a rotatable housing cover, the housing cover including the water inlet.

14. A strainer assembly for a marine engine, the strainer assembly comprising:
- a housing having a threaded upstream end, a downstream end having an outlet and an internal cavity therebetween, the housing having a flush port;
- a strainer removably located inside the internal cavity of the housing;
- a housing cover assembly removably secured to the upstream end of the housing, the housing cover assembly having an inlet adapted to introduce water into the internal cavity of the housing;
- a plug adapted to fit into and close the flush port of the housing;
- a rotatable collar for securing the plug in place wherein said plug may be removed and a threaded end of a hose secured to the flush port of the housing using the rotatable collar to flush the marine engine with fresh water.

15. The strainer assembly of claim 14 wherein the housing cover assembly comprises a retainer having external threads adapted to engage the threaded upstream end of the housing and a rotatable housing cover inside the retainer, the housing cover including the water inlet.

16. The strainer assembly of claim 14 further comprising a lanyard extending between the plug and the housing.

17. The strainer assembly of claim 14 wherein the inlet is generally L-shaped.

18. The strainer assembly of claim 14 wherein the flush port is located near the housing outlet.

19. The strainer assembly of claim 14 further comprising an O-ring located inside a groove of the housing cover assembly.

20. The strainer assembly of claim 14 further comprising an O-ring located inside a groove of the plug.

* * * * *